United States Patent
Miller et al.

(10) Patent No.: US 7,462,309 B2
(45) Date of Patent: Dec. 9, 2008

(54) METHOD FOR MAKING THERMOPLASTIC THERMALLY-CONDUCTIVE INTERFACE ARTICLES

(75) Inventors: James Miller, Marietta, GA (US); Kevin A. McCullough, North Kingstown, RI (US); E. Mikhail Sagal, Wakefield, RI (US); Jeffrey Panek, North Kingstown, RI (US)

(73) Assignee: Cool Shield, Inc., Warwick, RI (US)

( * ) Notice: Subject to any disclaimer, the term of this patent is extended or adjusted under 35 U.S.C. 154(b) by 633 days.

(21) Appl. No.: 11/014,613

(22) Filed: Dec. 16, 2004

(65) Prior Publication Data

US 2005/0109766 A1    May 26, 2005

Related U.S. Application Data

(62) Division of application No. 10/408,939, filed on Apr. 8, 2003, now abandoned.

(60) Provisional application No. 60/372,936, filed on Apr. 15, 2002.

(51) Int. Cl.
*B29C 45/00* (2006.01)

(52) U.S. Cl. .................... 264/104; 264/328.18

(58) Field of Classification Search ........... 264/328.1, 264/328.18, 104, 105
See application file for complete search history.

(56) References Cited

U.S. PATENT DOCUMENTS

| 5,011,870 | A |   | 4/1991  | Peterson ............... 523/220 |
|-----------|---|---|---------|-------------------------------|
| 5,021,494 | A |   | 6/1991  | Toya ..................... 524/404 |
| 5,060,114 | A |   | 10/1991 | Feinberg et al. ........ 361/387 |
| 5,523,049 | A | * | 6/1996  | Terpstra et al. .......... 419/36 |
| 5,945,217 | A |   | 8/1999  | Hanrahan ............... 428/389 |
| 6,048,919 | A |   | 4/2000  | McCullough .......... 524/404 |
| 6,251,978 | B1|   | 6/2001  | McCullough .......... 524/404 |
| 6,391,442 | B1|   | 5/2002  | Duvall et al. ........... 428/348 |
| 2002/0018338 | A1 | * | 2/2002 | McCullough ......... 361/709 |
| 2003/0220432 | A1 |   | 11/2003 | Miller et al. ............ 524/439 |

* cited by examiner

*Primary Examiner*—Jill L Heitbrink
(74) *Attorney, Agent, or Firm*—Barlow Josephs & Holmes, Ltd.

(57) ABSTRACT

A method for making a thermoplastic, thermally-conductive interface article is provided. The method used to make the interface article involves injection-molding a moldable composition into molding members. The moldable composition contains a base thermoplastic elastomer matrix, thermally-conductive filler material, and temperature-activated phase change material. The thermally-conductive articles can be used as thermal interfaces to dissipate heat from heat-generating electronic devices.

11 Claims, 2 Drawing Sheets

METHOD FOR MAKING THERMOPLASTIC THERMALLY-CONDUCTIVE INTERFACE ARTICLES

CROSS-REFERENCE TO RELATED APPLICATIONS

This application is a divisional of U.S. patent application Ser. No. 10/408,939 having a filing date of Apr. 8, 2003, now abandoned which claims the benefit of U.S. Provisional Patent Application Ser. No. 60/372,936 having a filing date of Apr. 15, 2002, the entire contents of which are hereby incorporated by reference.

BACKGROUND OF THE INVENTION

The present invention relates to a method for making thermally-conductive interface articles. A thermoplastic composition is used to make the articles. Particularly, the composition comprises a base thermoplastic elastomer matrix, thermally-conductive filler material, and temperature-activated phase change material. The thermally-conductive articles can be used as thermal interfaces to dissipate heat from heat-generating electronic devices.

Electronic devices such as semiconductors, microprocessors, resistors, and circuit boards generate a substantial amount of heat that must be removed in order for the device to function properly. The industry uses thermally-conductive compositions to dissipate heat from such electronic components. Conventional thermally-conductive compositions can be used in a variety of ways. For example, a thermally-conductive sheet or pad material can be used as an interface between the surface of the heat-generating device (for example, a memory chip on an electronic circuit board) and an adjacent heat-dissipating device (for example, heat sink or cold plate). Such conventional thermally-conductive materials are made frequently from compositions comprising a thermosetting silicone elastomer and thermally-conductive filler material.

For instance, Feinberg et al., U.S. Pat. No. 5,060,114 discloses a silicone pad for removing heat from a packaged electronic device. The silicone pad is made by adding thermally-conductive particles (for example, aluminum powder, nickel, aluminum oxide, iron oxide, beryllium oxide, or silver) to a mixture of silicone resins and curing agents. The mixture is poured into a mold and cured in a heated oven.

Toya, U.S. Pat. No. 5,021,494 discloses a thermally-conductive silicone material comprising: a) polyorganosiloxane; b) a polyorganohydrogensiloxane; and c) a catalyst selected from the group consisting of platinum and platinum compounds; d) heat-transfer filler particles (for example, metals, metal oxides, or ceramics); and e) an adhesion promoter which cures through addition reactions.

Peterson, U.S. Pat. No. 5,011,870 discloses thermally-conductive organosiloxane compositions comprising a polyorganosiloxane and a mixture of thermally-conductive fillers including finely divided aluminum nitride particles and particles of an additional thermally-conductive filler that is compatible with the polyorganosiloxane.

In other applications, thermal pastes or greases containing polysiloxane oils and thermally-conductive fillers are smeared onto the electrical and heat-sink components to form a thermally-conductive interface.

It is also known that thermally-conductive polytetrafluoroethylene (PTFE) articles can be made. Hanrahan, U.S. Pat. No. 5,945,217 discloses a thermally-conductive interface comprising a PTFE matrix, thermally-conductive particles, and a phase change material. The patent describes making a composition by first coagulating a slurry of boron nitride with an aqueous dispersion of PTFE to form a powder and then compounding the powder with a lubricant consisting of polyethylene glycol and isopropyl alcohol.

Although the foregoing compositions and materials can be somewhat effective as thermally-conductive interfaces for some heat-removal applications, there is a need for an improved thermally-conductive composition having the following properties: 1) the composition should be capable of being net-shape molded into a desired interface article (for example, a film, gasket, or pad) so that no further tooling is required to produce the final shape of the interface article; 2) the composition (shaped article) should be capable of providing a tightly conforming interface between the heat-generating and heat-dissipating devices; 3) the composition (shaped article) should have good overall thermal conductivity and low contact resistance at the surfaces of the heat-generating and heat-dissipating devices.

The present invention provides an improved thermoplastic, thermally-conductive composition having the foregoing properties among others. The composition can be used to make thermally-conductive articles for use as thermal interfaces. The invention also encompasses methods for making such thermally-conductive articles.

SUMMARY OF THE INVENTION

The present invention relates to a method for making a thermally-conductive interface article. The method involves injection-molding a thermoplastic composition into molding members to form the article. The composition comprises: a) about 20% to about 80% by weight of a thermoplastic elastomer matrix, b) about 20% to about 80% by weight of a thermally-conductive, filler material; and c) about 5 to about 50% by weight of a phase change material. Examples of suitable thermoplastic elastomers include styrenic copolymers, polyester copolymers, polyurethane copolymers, and polyamide copolymers as well as thermoplastic/elastomer blends such as thermoplastic polyolefins and thermoplastic vulcanizates. The thermally-conductive filler material can be a metal, metal oxide, ceramic, carbon material, or other suitable material. For example, the thermally-conductive filler can be aluminum, copper, magnesium, brass, alumina, zinc oxide, boron nitride, or carbon graphite. The thermally-conductive filler can be in the form of particles, fibers, or any other suitable form.

The phase-change material can be a material that changes from a solid state to a liquid state and from a liquid state to a solid state within a temperature range of about 10° C. to about 115° C. For example, the phase change material can be selected from the group consisting of hydrate salts, beeswax, paraffin wax, polyethylene glycol, polyethylene, polyhydric alcohols, or chlorinated naphthalene. Additives, such as adhesives, tackifiers, and coloring agents, can be incorporated into the composition.

The invention also encompasses thermally-conductive articles made from the compositions of this invention. The articles can be used as thermally-conductive interfaces between heat-generating and heat-dissipating devices. Examples of such articles include films, pads, and sheets. Preferably, the articles have a thermal conductivity of greater than 3 W/m° K., and more preferably greater than 22 W/m° K. In addition, the articles can have good electrical-conductivity properties.

BRIEF DESCRIPTION OF THE DRAWINGS

The novel features characteristic of the present invention are set forth in the appended claims. However, the preferred embodiments of the invention, together with further objects and attendant advantages, are best understood by reference to the following detailed description taken in connection with the accompanying drawings in which:

DETAILED DESCRIPTION OF THE PREFERRED EMBODIMENTS

Figure 1:
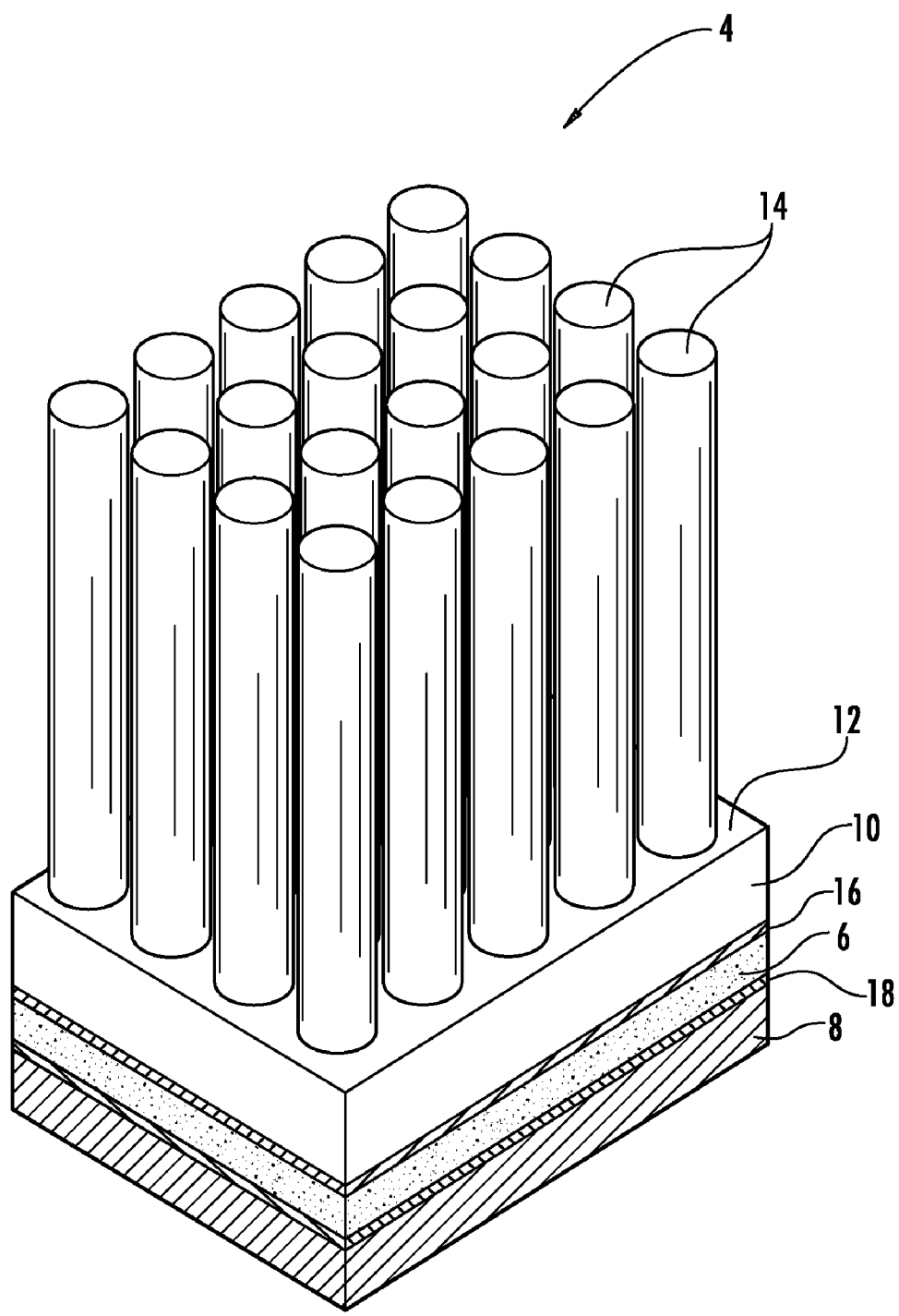
FIG. 1 is a perspective view of an assembly showing a heat-sink, circuit board, and thermoplastic, thermally-conductive interface article of the present invention.

The present invention relates to a method for making a thermally-conductive interface article. A thermoplastic composition is used in the method to make the article. The articles can be used as thermal interfaces between heat-generating and heat-dissipating devices.

The thermally-conductive composition comprises a thermoplastic elastomer base matrix. Thermoplastic elastomers are lower modulus, flexible materials that can be stretched repeatedly and are able to retract to their original length when released. Thermoplastic elastomers are generally known materials and comprise a hard thermoplastic phase coupled mechanically or chemically with a soft, elastomeric phase. Suitable thermoplastic elastomers include, for example, copolymers selected from the group consisting of styrenic copolymers such as styrene-butadiene-styrene (SBS), styrene-ethylene/butylene-styrene (SEBS), styrene-isoprene-styrene (SIS), and styrene-ethylene/propylene-styrene (SEPS); polyester copolymers; polyurethane copolymers; and polyamide copolymers. Thermoplastic elastomers also include thermoplastic/elastomer blends and alloys such as non-cross-linked polyolefins that are thermoplastic and thermoplastic vulcanizates. These thermoplastic/elastomer blends and alloys are collectively known as thermoplastic rubbers. As used herein, the term, "thermoplastic elastomers", does not include fluorocarbon polymers such as polytetrafluoroethylene (PTFE). Generally, the thermoplastic elastomer matrix comprises about 20 to about 80% by weight of the total composition and more particularly about 40 to about 80% by weight of the composition.

It is important that the matrix comprises a thermoplastic elastomer for purposes of the present invention. Particularly, the thermoplastic elastomer is significant, because it acts as a carrier and provides an effective polymer network for the phase change materials, thermally/electrically conductive filler materials, and any additives that further make-up the composition. The thermoplastic elastomer is compatible with these other components. These components can be dispersed completely and uniformly in the thermoplastic elastomer matrix. Further, the matrix can retain the phase change material when the material changes to a liquid phase as discussed in further detail below. The thermoplastic elastomer matrix helps make the composition net-shape moldable. Further, the thermoplastic elastomer matrix imparts rubber-like consistency, elasticity, and other desirable flexible properties to the shaped article.

In the present invention, thermally-conductive filler materials are added to the thermoplastic elastomer matrix. Suitable filler materials include, for example, metals such as aluminum, copper, silver, nickel, magnesium, brass; metal oxides such as alumina, magnesium oxide, zinc oxide, and titanium oxide; ceramics such as silicon nitride, aluminum nitride, boron nitride, boron carbide; and carbon materials such as carbon black and graphite; and the like. Mixtures of such fillers are also suitable. Generally, the thermally-conductive fillers comprise about 20 to about 80% by weight of the total composition and more particularly about 30 to about 60% by weight of the composition.

The filler material can be in the form of particles, granular powder, whiskers, fibers, or any other suitable form. The particles or granules can have a variety of structures and a broad particle size distribution. For example, the particles or granules can have flake, plate, rice, strand, hexagonal, or spherical-like shapes with a particle size in the range of 0.5 to 300 microns. In some instances, the filler material can have a relatively high aspect (length to thickness) ratio of about 10:1 or greater. For example, PITCH-based carbon fiber having an aspect ratio of about 50:1 can be used. Alternatively, the filler material can have a relatively low aspect ratio of about 5:1 or less. For example, boron nitride grains having an aspect ratio of about 4:1 can be used. Both low aspect and high aspect ratio filler materials can be added to the thermoplastic elastomer matrix as described in McCullough, U.S. Pat. Nos. 6,251,978 and 6,048,919, the disclosures of which are hereby incorporated by reference. Particularly, the compositions of this invention can contain about 25 to about 60% by weight of a filler having a high aspect ratio of about 10:1 or greater, and about 10 to about 25% by weight of a filler having a low aspect ratio of about 5:1 or less.

It is recognized that the filler material may be electrically conductive for applications where efficient electrical transmission is needed such as in grounding or in electromagnetic interference (EMI) shielding devices. Particularly, the filler material may be selected so that the composition and shaped articles produced from the composition have a volume resistivity of approximately 0.1 ohm-cm or lower and a surface resistivity of 1.0 ohm or lower.

The composition of the present invention further comprises a temperature-activated phase change material that can change from a solid state to a liquid state and from a liquid state to a solid state within a temperature range of about 10° C. to about 115° C. The phase change material becomes a molten, liquid material at a higher temperature and solidifies at a lower temperature within this temperature range. The phase change material can be any suitable material such as a hydrated salt, natural wax (for example, beeswax or carnauba); a petroleum-based wax (for example, a paraffin wax); or a synthetic wax (for example, polyethylene glycol, polyethylene, polyhydric alcohols, or chlorinated naphthalene). Generally, the phase change material comprises about 5 to about 50% by weight of the total composition and more particularly about 5 to about 30% by weight of the composition.

It is recognized that additives such as antioxidants, plasticizers, stabilizers, dispersing agents, coloring agents, tackifiers, adhesives, and the like can be added to the composition in accordance with this invention. The thermoplastic elastomer matrix is generally compatible with such additives so that the additives are completely dispersed within the matrix.

The thermally-conductive composition containing the phase change material can be used to make a variety of shaped articles. The articles can be employed as interfaces between a heat-generating device (for example, electronic part) and heat-dissipating device (for example, heat sink or cold plate). In operation, the heat-generating electronic part transmits a substantial amount of heat to the interface article. The phase change material will melt at these operating temperatures which are generally less than about 115° C. and more typically less than about 90° C. As the phase change material melts, it forms a liquid film at the contact surfaces of the interface article, electronic part, and heat sink. The film coating comprising the phase change material lowers the thermal resistance of the contact surfaces. Particularly, the liquid phase change material helps minimize thermal resistance at the surface where the interface article and electronic part contact each other, and at the surface where the interface article and heat sink contact each other. The phase change material improves the overall thermal transfer properties of the assembly so that heat can be removed quickly and efficiently from the heat-generating electronic part. The thermoplastic elastomer matrix of the thermally-conductive composition (interface) is important, because it provides a network for containing the liquid phase change material and prevents it from flowing out of the interface.

In preparing the composition of this invention, the filler and phase change materials are intimately mixed with the non-conductive thermoplastic elastomer matrix. The loading of the filler material in the matrix imparts thermal conductivity to the composition. The mixture can be prepared and shaped into a thermally-conductive article using techniques known in the art. First, the ingredients are mixed preferably under low shear conditions in order to avoid damaging the structures of the filler materials. The phase change material can be added to the mixture in solid or liquid form. The resulting composition can be shaped into the desired article using any suitable molding process such as melt-extrusion, casting, or injection-molding.

For example, the composition can be melt-extruded into a film. It has been found that very thin films can be produced from the compositions of the present invention. Particularly, the films can have a thickness of as little as 0.5 mils. The films made from the compositions of this invention have high planar (lateral) strength and mechanical integrity. These excellent mechanical properties are found in both thick and thin films of the present invention.

In contrast, many conventional films are made from silicone-based filler compositions as discussed above. These silicone films generally need to have a minimum thickness of 2 mils. When silicone and other conventional films having a thickness of less than 2 mils are made, they tend to have very little planar (lateral) strength. The silicone films can fall apart during handling. In many instances, the silicone films must be applied to a supporting substrate material such as a carrier film in order to have a sufficiently strong product. Conventional silicone-based and fluoropolymer interface compositions and films have other disadvantageous features. For example, in silicone-based compositions, the silicone resin and filler material can be incompatible due to their different densities and low viscosity of the silicone resin. Likewise, in fluoropolymer-based compositions, for example polytetrafluoroethylene (PTFE) compositions, the fluoropolymer and filler material can be incompatible. The fillers can settle and be non-uniformly dispersed within the silicone or fluoropolymer matrix. Also, the silicone compositions and films typically need to be cured to set the silicone and produce the ultimate article.

The composition of the present invention can be used to make articles other than films, for example, thermally-conductive, EMI/RFI shielding gaskets; interface sheets; or interface pads. The thermally-conductive gaskets are particularly suitable for use in harsh conditions due to their high mechanical strength. Such gaskets maintain high thermal conductivity over repeated use. Thus, the gaskets can be used continuously over many thermal heating and cooling cycles. The gaskets are advantageous over conventional materials made from cured silicone and silicone-filled compositions or graphite foils.

Conventional injection-molding techniques can be employed to produce such gaskets and other shaped articles in accordance with this invention. In general, injection-molding involves the steps of: (a) feeding the composition into the heating chamber of an injection molding machine and heating the composition to form a molten composition; b) injecting the molten composition into a mold cavity; c) maintaining the composition in the mold under high pressure until it cools; and d) removing the molded article.

Referring to FIG. 1, an assembly 4 containing the thermoplastic, thermally-conductive film 6 of the present invention is shown. (In FIG. 1, the article is shown in the form of a film for illustration purposes only. it is understood that the article can have a wide variety of structures.) The assembly includes a heat-generating electrical circuit 8 and heat sink device 10. The top surface 12 of the heat sink 10 contains a series of rod structures 14 that serve as heat-dissipating members for dissipating the heat into the air. The thermoplastic, thermally-conductive film 6 contacts and tightly conforms to the lower surface 16 of the heat sink 10 and the heat-generating upper surface 18 of the electrical circuit 8.

It is known that conventional electronic parts and/or heat sink devices can have small voids or other minor manufacturing defects on their contact surfaces. When these components are mated together, small gaps may appear at their interface. Also, tiny air gaps can form at the interface of the electronic part and heat sink. These gaps and defects can inhibit the flow of heat between the components. The interface articles of the present invention solve this problem by providing a tightly conforming layer between the electronic part and heat sink. As discussed above, the thermoplastic elastomer matrix imparts desirable rubber-like properties to the shaped articles. The articles are highly compressible and conform to gaps and voids located on the components' mating surfaces, thereby creating an effective interface. In addition, as discussed above, the phase change material forms a liquid film at standard operating temperatures for the electronic part. The film can conform to any gaps and voids at the interface, thereby improving the overall thermal conductivity of the assembly.

In contrast, many conventional films do not have good conformable properties resulting in poor transmission of heat from the electronic part to heat sink.

Figure 2:
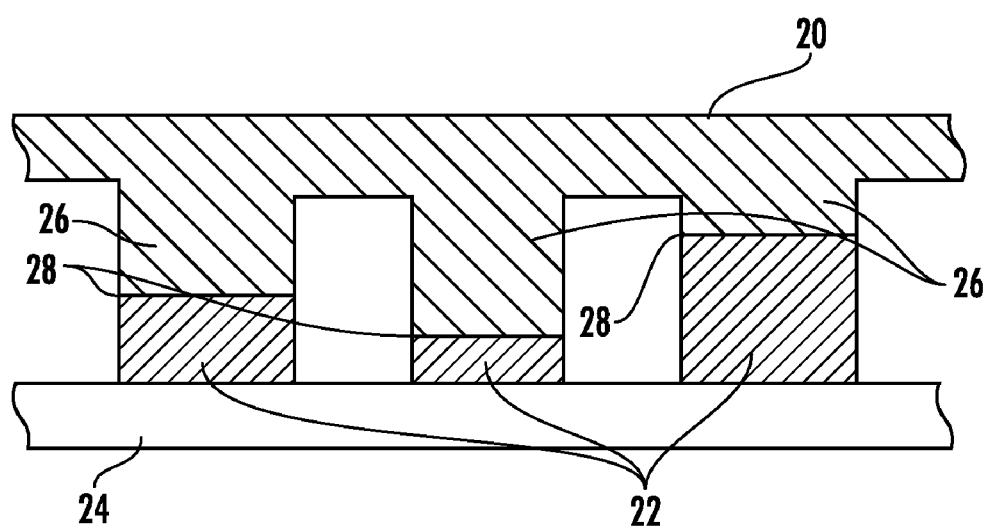
FIG. 2 is a cross-sectional view of an assembly showing a thermoplastic, thermally-conductive interface article of the present invention and a circuit board containing heat-generating elements.

Further, since the composition of the present invention is melt-processable, the composition can be net-shape molded into parts having complex structures and geometries. For instance, the composition can be injection-molded to form a flexible interface pad containing numerous recessed portions along its contour. The surface of the interface pad can span over multiple heat-generating elements on a circuit board even if the elements have varying dimensions. Such an assembly is shown in FIG. 2, where an interface pad 20 made in accordance with the present invention spans over multiple heat-generating elements 22 located on circuit board 24. The heat-generating elements 22 can be, for example, integrated memory chips. The protruding sections 26 of the pad 20 form a thermal interface 28 with the elements 22 so that the elements 22 can be cooled efficiently.

In general, the thermoplastic, thermally-conductive articles of the present invention have many advantageous features over silicone and other conventional thermally-conductive articles including the following. The articles of the present invention have improved thermal conductivity properties. Preferably, the articles have a thermal conductivity of greater than 3 W/m° K., and more preferably greater than 22 W/m° K. Moreover, the articles can have good electrical conductivity as discussed above. Further, the articles can provide a tightly conforming interface between a heat-generating and heat-dissipating device. In addition, the interface articles of this invention have high mechanical strength and maintain high thermal conductivity over repeated thermal heating and cooling cycles. Also, the interface articles can be net-shape molded meaning that the final shape of the article is determined by the shape of a mold cavity. No further processing, die-cutting, machining, or other tooling is required to produce the final shape of the article.

It is appreciated by those skilled in the art that various changes and modifications can be made to the description and illustrated embodiments without departing from the spirit of the present invention. All such modifications and changes are intended to be covered by the appended claims.

What is claimed is:

1. A method of making a net-shape molded, thermoplastic, thermally-conductive interface article, comprising the steps of:

providing a molten composition comprising:

about 40% to about 80% by weight of a thermoplastic elastomer matrix that is solid at the operational temperature range of the interface article of between about 10° C. to about 115° C.;

about 20% to about 60% by weight of a thermally-conductive filler material including a mix of high aspect ratio fillers and low aspect ratio fillers; and about 5 to about 50% by weight of a phase change material dispersed throughout said elastomer matrix, said phase change material being capable of changing from a solid state to a liquid state and from a liquid state to a solid state within a temperature range of about 10° C. to about 115° C.;

injecting the molten composition into a mold at a temperature greater than the melting point of the thermoplastic elastomer matrix;

removing the composition from the mold to form a net-shape molded, thermoplastic, thermally-conductive interface article having an operational range of between about 10° C. to about 115° C., wherein said elastomer matrix in a solid state contains said phase change material in a liquid state.

2. The method of claim 1, wherein the interface article is a pad-like article, said article having recessed and non-recessed portions along its contour.

3. The method of claim 1, wherein the interface article is a shielding gasket.

4. The method of claim 1, wherein the interface article has a thermal conductivity of greater than 3 W/m° K.

5. The method of claim 1, wherein the interface article is electrically conductive and has a volume resistivity of 0.1ohm-cm or lower and a surface resistivity of 1.0ohm-cm or lower.

6. The method of claim 1, wherein the thermoplastic elastomer matrix of the composition comprises a material selected from the group consisting of styrenic copolymers, polyester copolymers, polyurethane copolymers, and polyamide copolymers.

7. The method of claim 1, wherein the thermoplastic elastomer matrix of the composition comprises a thermoplastic rubber.

8. The method of claim 1, wherein the thermally-conductive filler material of the composition is a metal, metal oxide, ceramic, or carbon material.

9. The method of claim 1, wherein the thermally-conductive filler material of the composition is selected from the group consisting of aluminum, copper, magnesium, brass, alumina, magnesium oxide, silicon nitride, boron nitride, carbon black, and carbon graphite.

10. The method of claim 1, wherein the phase change material of the composition is a wax.

11. The method of claim 1, wherein the phase change material of the composition is selected from the group consisting of beeswax, paraffin wax, polyethylene glycol, polyethylene, polyhydric alcohols, and chlorinated naphthalene.

* * * * *